(12) United States Patent
Malik

(10) Patent No.: US 7,299,157 B2
(45) Date of Patent: Nov. 20, 2007

(54) EVENT ANALYSIS SYSTEM, METHOD AND SOFTWARE

(76) Inventor: Omar Malik, The Mansells, Upper Minety, Malmesbury, Wiltshire, SN16 9PY (GB)

(*) Notice: Subject to any disclaimer, the term of this patent is extended or adjusted under 35 U.S.C. 154(b) by 55 days.

(21) Appl. No.: 11/283,206

(22) Filed: Nov. 18, 2005

(65) Prior Publication Data
US 2006/0150022 A1 Jul. 6, 2006

(51) Int. Cl.
*G06F 11/30* (2006.01)
(52) U.S. Cl. .................................................. 702/185
(58) Field of Classification Search ............... 702/123, 702/181, 182, 183, 185, 186; 714/4, 38, 714/43; 717/121, 173
See application file for complete search history.

(56) References Cited

U.S. PATENT DOCUMENTS 6,671,818 B1 * 12/2003 Mikurak ...................... 714/4
2006/0004687 A1 * 1/2006 Boyd et al. .................. 707/1

* cited by examiner

*Primary Examiner*—Bryan Bui
(74) *Attorney, Agent, or Firm*—Gamburd Law Group LLC

(57) ABSTRACT

An event analysis system employs a Failure Path™ methodology to extract useful information concerning an adverse event that has happened or is being conjectured, to assist subsequent decision making. An exemplary event analysis system may be implemented in software on a desktop computer and employs linked data to identify in an objective manner those contributing factors of an adverse event and possible rectification actions to prevent similar adverse events occurring in future.

41 Claims, 7 Drawing Sheets

FIGURE 4A

| | Step 106<br>Factors | Step 107<br>PO2PL | Step 108<br>Option | Step 109<br>Effect | Step 110<br>Degree of Probability | Step 111<br>Internal Locus | Step 111'<br>External Locus |
|---|---|---|---|---|---|---|---|
| 1 | Formation of ice | PO2PL | Hangar aircraft | TLA | Certain | Doc | |
| 2 | Detection of ice | | | | | | |
| 2.iv | - A/C system | PO2PL | Detect Ice | TLA | Hi Prob | Doc / Human / Tech | |
| 3 | Report Detection to - Flight Crew | | | | | | |
| 3.i | - Ground Crew | PO2PL | Report | TLA | Prob | Doc / Human | |
| 3.ii | - Other Persons | PO2PL | Report | TLA | Prob | Human | |
| 3.iii | - Airport Authority | PO2PL | Report | TLA | Prob | Doc | |
| 4 | Removal of Ice | | | | | | |
| 4.i | - Flight Crew | PO2PL | Act | TLA | Certain | Doc / Human | |
| 4.ii | - Manufacturer | PO2PL | Mandate | TLA | Certain | Doc / Human / Tech | |
| 4.iii | - Operating Company | PO2PL | Mandate | TLA | Certain | Doc | |
| 4.iv.a | - Licensing Authority | PO2PL | Mandate | TLA | Certain | Doc | |
| 4.iv.b | - Licensing Authority | PO2PL | Delete Advice | TLA | Poss | Doc | |
| 4.v | - Airport Authority | PO2PL | Mandate | TLA | Hi Prob | Doc | |
| 5 | Aerodynamic Effect of Ice | PO2PL | Aerofoil Design | TLA | Poss | Tech | |
| 6 | Prevention of Adverse Outcome | | | | | | |
| 6.i | - Wing Ice Detect'n System | PO2PL | Modify | TLA | Hi Prob | Tech | |
| 6.ii | - Wing Ice Warning System | PO2PL | Modify | TLA | Hi Prob | Tech | |
| 6.iii.a | - Wing Antice System | PO2PL | Turn On | TLA | Poss | Human | |
| 6.iii.b | - Wing Antice System | PO2PL | Improve | TLA | Certain | Doc / Human / Tech | |
| 6.iv | - Flight Crew Action | PO2PL | No Take Off | TLA | Certain | Human | |
| 6.iv.a | - Medical Advice | PO2PL | Tighten | TLA | Poss | Doc | |
| 6.v | - ATC | PO2PL | Intervene | TLA | Certain | Doc / Human | |
| 6.vi | - Stall Protection System | PO2PL | Modify | Nil | - | Doc / Human / Tech | |

FIGURE 4B

| | Factors | Sub-System | Category | Status | Stage | Site | Step 113 Point of Responsibility | Nature of Failure | Step 114 Rectific'n |
|---|---|---|---|---|---|---|---|---|---|
| 1 | Formation of Ice | Doc | Co. Order | Mand/Adv | Found'n | Co. Orders | Company | Omit'd | Mandate |
| 2 | Detection of Ice | | | | | | | | |
| 2.iv | - A/C system | Doc | A/c Spec | Mand | Found'n | FAA/Manu/Co/JAA | FAA/Manu/Co/JAA | Omit'd | Mandate |
| 3 | Report Detection to Flight Crew | | | | | | | | |
| 3.i.a | - Ground Crew | Doc | Co. Order | Mand | Found'n | Co. Orders | Company | Omit'd | Mandate |
| 3.i.b | - Ground Crew | Human | Decision | Discret'n | Found'n | Grd. Crew | Ground Crew | Omit'd | Mandate |
| 3.ii | - Other Persons | Human | Decision | Discret'n | Found'n | Other P. | Other Persons | Omit'd | Recommend |
| 3.iii | - Airport Authority | Doc | Order | Mand | Found'n | BAA Doc | BAA | Omit'd | Mandate |
| 4 | Removal of Ice | | | | | | | | |
| 4.i | - Flight Crew | Human | Decision | Discret'n | Final | Flt. Crew | Flt. Crew | Omit'd | Tighten |
| 4.ii | - Manufacturer | Human | Decision | Mand | Found'n | A/C Limit'ns | Manufacturer | Unsafe | Mandate |
| 4.iii | - Operating Company | Doc | Co. Order | Mand | Found'n | Co. Orders | Company | Unsafe | Mandate |
| 4.iv.a | - Licensing Authority | Doc | Order | Mand | Found'n | FAA/CAA Doc | FAA | Unsafe | Mandate |
| 4.iv.b | - Licensing Authority | Doc | Advice | Adv | Found'n | FAA Doc | FAA | Unsafe | Delete |
| 4.v | - Airport Authority | Doc | Inform'n | Adv | Found'n | BAA Doc/ATIS | BAA | Omit'd | Mandate |
| 5 | Aerodynamic Effect of Ice | Tech | A/c Spec | Mand/Adv | Found'n | FAA/Manu/Co/JAA | FAA/Manu/Co/JAA | Omit'd | Mandate |
| 6 | Prevention of Adverse Outcome | | | | | | | | |
| 6.i | - Wing Ice Detect'n System | Tech | A/c Spec | Mand | Found'n | FAA/Manu/Co/JAA | FAA/Manu/Co/JAA | Omit'd | Mandate |
| 6.ii | - Wing Ice Warning System | Tech | A/c Spec | Mand | Found'n | FAA/Manu/Co/JAA | FAA/Manu/Co/JAA | Omit'd | Mandate |
| 6.iii.a | - Wing Antice System | Human | Decision | Discret'n | Found'n | Flt Crew | Flt Crew | Omit'd | Mandate |
| 6.iii.b | - Wing Antice System | Doc | A/c Spec | Mand | Found'n | FAA/Manu/Co/JAA | FAA/Manu/Co/JAA | Omit'd | Mandate |
| 6.iv | - Flight Crew Action | Human | Decision | Discret'n | Final | Flt. Crew | Flt. Crew | Omit'd | Tighten |
| 6.iv.a | - Medical Advice | Doc | Advice | Adv | Found'n | FAA/Co Doc | FAA/Co | Lax | Tighten |
| 6.v | - ATC | Doc | Order | Mand | Found'n | BAA Doc | BAA | Omit'd | Mandate |
| 6.vi | - Stall Protection System | Doc | A/c Spec | Mand | Found'n | FAA/Manu/Co/JAA | FAA/Manu/Co/JAA | Omit'd | Mandate |

FIGURE 5A

| | Step 106 Factors | Step 107 | Step 108 Option | Step 109 Effect | Step 110 Degree | Step 111 Internal Locus | Step 111 | Step 111' External Locus |
|---|---|---|---|---|---|---|---|---|
| 1 | Mechanical Connection | PO2PL | Dedicated IT | HLA | Certain | Technical | | |
| 2 | Drug Identification | | | | | | | |
| 2.i | - IT pack colour code | PO2PL | Distinct | HLA | Hi Prob | Doc / Human | | |
| 2.ii | - IT pack label | PO2PL | Clear | HLA | Hi Prob | Doc / Human | | |
| 2.iii | - IT pack shape/size | PO2PL | Distinct | HLA | Hi Prob | Doc / Human | | |
| 2.iv | - IT syringe shape/size | PO2PL | Distinct | HLA | Hi Prob | Doc / Human | | |
| 3 | Drug Handling | PO2PL | Separate | HLA | Certain | Doc / Human | | |
| 4 | Training | | | | | | | |
| 4.i | - IT awareness | PO2PL | Instil | HLA | Hi Prob | Doc / Human | | |
| 4.ii | - Formalise | PO2PL | Mandate | HLA | Hi Prob | Doc / Human | | |
| 5 | Supervision | PO2PL | Mandate | HLA | Hi Prob | Doc / Human | | |
| 6 | Authorization | PO2PL | Mandate | HLA | Hi Prob | Doc / Human | | |
| 7 | Procedures and Protocols | | | | | | | |
| 7.i | - Mutual monitoring | PO2PL | Mandate | HLA | Certain | Doc / Human | | |
| 7.ii | - Formalise | PO2PL | Mandate | HLA | Certain | Doc / Human | | |
| 8 | Patient Conduct | PO2PL | Comply | HLA | Hi Prob | | | External |
| 9 | Final Event Handling | PO2PL | Assure | HLA | Certain | Human | | |
| 10 | Information Sharing | | | | | | | |
| 10.i | - System | PO2PL | Mandate | HLA | Prob | Doc / Human | | |
| 10.ii | - Incident reporting | PO2PL | Mandate | HLA | Prob | Doc / Human | | |
| 11 | Safety Organisation | PO2PL | Establish | HLA | Hi Prob | Doc / Human | | |

FIGURE 5B

| | Factors | Option | Sub-System | Category | Status | Stage | Site | Step 113 Point of Responsib'y | Nature of Failure | Step 114 Rectifc'n |
|---|---|---|---|---|---|---|---|---|---|---|
| 1 | Mechanical Connection | Dedicated IT | Tech | Needle Design | Mand | Found'n | Needle connector | DoH | Omitted | Mandate |
| 2 | Drug Identification | | | | | | | | | |
| 2.i | - IT pack colour code | Distinct | Doc | Co. spec | Mand | Found'n | Co. spec | Co. Board | Omitted | Mandate |
| 2.ii | - IT pack label | Clear | Doc | Co. spec | Mand | Found'n | Co. spec | Co. Board | Omitted | Mandate |
| 2.iii | - IT pack shape/size | Distinct | Doc | Co. spec | Mand | Found'n | Co. spec | Co. Board | Omitted | Mandate |
| 2.iv | - IT syringe shape/size | Distinct | Doc | Co. spec | Mand | Found'n | Co. spec | Co. Board | Omitted | Mandate |
| 3 | Drug Handling | Separate | Hum | H. Protocol | Mand | Found'n | H. Protocol | H. Board | Unsafe - General | Enforce |
| 4 | Training | | | | | | | | | |
| 4.i | - IT awareness | Instil | Hum | H Procedure | Mand | Found'n | H Procedure | H. Board | Omitted | Mandate |
| 4.ii | - Formalise | Mandate | Doc | H Procedure | Mand | Found'n | H Procedure | H. Board | Omitted | Mandate |
| 5 | Supervision | Mandate | Doc | H Procedure | Mand | Found'n | H Procedure | H. Board | Omitted | Mandate |
| 6 | Authorization | Mandate | Doc | H Procedure | Mand | Found'n | H Procedure | H. Board | Omitted | Mandate |
| 7 | Procedures and Protocols | | | | | | | | | |
| 7.i | - Mutual monitoring | Mandate | Hum | H. Directive | Mand | Found'n | Several | H. Board | Omitted | Mandate |
| 7.ii | - Formalise | Mandate | Doc | H. Directive | Mand | Found'n | Several | H. Board | Omitted | Mandate |
| 8 | Patient Conduct | Comply | | Patient | Advisory | Final | External | Patient | Lax | Comply |
| 9 | Final Event Handling | Assure | Hum | Action | Discretion | Final | Doctors | Doctors | Lax | Tighten |
| 10 | Information Sharing | | | | | | | | | |
| 10.i | - System | Mandate | Hum | DoH | Mand | Found'n | DoH Regulat'n | DoH | Omitted | Mandate |
| 10.ii | - Incident reporting | Mandate | Doc | DoH | Mand | Found'n | DoH Regulat'n | DoH | Omitted | Mandate |
| 11 | Safety Organisation | Establish | Doc | DoH | Mand | Found'n | DoH Regulat'n | DoH | Omitted | Mandate |

EVENT ANALYSIS SYSTEM, METHOD AND SOFTWARE

CROSS-REFERENCE TO RELATED APPLICATION

This application is a continuation in part of and claims priority to United Kingdom of Great Britain Patent Application Serial No. 0425486.8, filed 19 Nov. 2004, inventor Omar Malik, entitled "Event Analysis System and Method", the contents of which are incorporated herein by reference, and with priority claimed for all commonly disclosed subject matter.

FIELD OF THE INVENTION

The present invention relates to an event analysis system and an event analysis method for use in the study of events and their outcomes. In particular, but not exclusively, the present invention is adapted for the analysis of events resulting in an error or failure.

DESCRIPTION OF THE RELATED ART

In areas such as health and safety and finance, techniques have been devised to assist in the assessment of risk. In this context risk is generally deemed to be the total of the likelihood of an adverse event occurring multiplied by its probable costs. The tools of risk assessment are employed to minimise the likelihood and impact of such adverse events occurring in future. Existing methods of risk assessment are broadly either quantitative or qualitative. The former is based upon assumptions regarding the relevance of past experience on present and future trends, and on the mathematical relationship of the factors. Quantitative risk assessment tools are therefore vulnerable to weaknesses in the assumptions that are relied upon and in the often complex statistical mathematics employed. Qualitative risk assessment tools, on the other hand, rely upon accumulated expertise and are often inaccessible to those lacking the necessary knowledge and expertise. More importantly, central to both types of risk assessment tools is the use of probability to relate factor to outcome and their frequent reliance upon the principles of either event trees or fault trees.

An event tree is primarily a planning tool. It starts at the beginning of a process, and with an assumption with respect to an untoward event or of a failure of a system component. Then by means of a series of hypothetical what-if events, often with probabilities attached, it traces forward to the possible outcomes. The use of an event tree facilitates planning for the prevention of the most adverse outcomes through the introduction of suitable safeguards into the system. A clear illustration of an event tree may be found in *Risk: Analysis, Perception and Management*, The Royal Society: London, 1992, p 17, FIG. 1.

In contrast, a fault tree starts at the final outcome in the form of an adverse event. It then traces backwards by means of a series of hypothetical circumstances, identifying those which would possibly contribute to the outcome. The fault tree, though, is dependent upon circumstance probabilities and a rigorous analysis using a fault tree can become highly complex because the different contribution of each permutation of combined circumstances must be considered, i.e. the different contributions of A and B, A or B, A and ? etc. *Understanding Systems Failures*, Bignell and Fortune, Manchester University Press: Manchester, 1998, pp 181-187 provides a helpful overview of the use of fault trees.

Both event trees and fault trees have the disadvantage that they are open systems, often with no obvious boundaries to their content. As a result they have a tendency to become divergent and a user may be faced with a very large number of factors from which the user must seek to identify those of greatest relevance usually by means of expertise based or statistical assumptions. As a result of the statistics- or expertise-based assumptions at the core of existing quantitative and qualitative risk assessment schemes, such schemes are to some degree unavoidably speculative and subjective.

SUMMARY OF THE INVENTION

However, the present invention is concerned with event analysis as opposed to risk assessment. In essence, the present invention seeks to provide a system and a method for conducting an audit of any environment and for identifying within the environment all factors relating to a specific adverse outcome. More particularly, the present invention seeks to provide a system and method of event analysis which is objective or at least quasi-objective and which is not founded on quantitative statistical information or qualitative speculative assumptions.

The present invention therefore provides in a first aspect a computer implemented event analysis method for identifying contributing factors relating to an event to be analysed, the method comprising the steps, one or more of which are computer implemented, of: identifying one or more relevant environment factors which are relevant to the analysis of the event and which may have the potential to alter the outcome of the event; determining for each of said one or more relevant environment factors whether the relevant environment factor has a potential to alter the outcome of the event; and for each relevant environment factor that is identified as having a potential to alter the outcome of the event, identifying the location, within the environment of the event, of the relevant environment factor's opportunity to alter the outcome of the event.

In a preferred embodiment the computer implemented event analysis method further comprising the step of collecting data concerning the environment of the event to be analysed to form an inventory of the environment. The inventory may comprise a plurality of sections including a first section comprising data relating to documents which define aspects of the environment in which the event has or may occur; and a second section comprising data which describe the individuals and any organisation of those individuals which define aspects of the environment in which the event has or may occur. Moreover, the inventory may include a third section comprising data relating to technical modules, components and processes which define aspects of the environment in which the event has or may occur. By means of the inventory the location in the environment of a relevant environment factor's opportunity to alter the outcome of the event is identified with respect to one of the sections of the plurality of sections of the inventory.

More preferably, where an identified location in the environment of a relevant environment factor's opportunity to alter the outcome of the event corresponds to one section of a plurality of sections of the inventory, the method comprises the further step of identifying a point of responsibility, being that person or organisation having responsibility for the location of the relevant environment factor's opportunity.

In accordance with the invention the method may further comprise identifying for each relevant environment factor whether the relevant environment factor has the capacity to be altered. Ideally, where a relevant environment factor has been identified as having the capacity to be altered, an effect in terms of a possible change to the event is also identified with respect to alteration of the relevant environment factor. Furthermore, an effect in terms of a possible change to the event may be identified with respect to alteration of the relevant environment factor and the effect may be assigned a rating being representative of the likelihood of an alteration to the relevant environment factor causing an alteration to the outcome of the event.

In a further preferred embodiment of the invention for those relevant environment factors that are identified as having a potential to alter the outcome of the event, a rectification is identified being an action which would alter the outcome of the event.

Ideally, the method further comprise the step of producing one or more reports in which is recorded data on the relevant environment factors which are identified as having a potential to alter the outcome of the event, their locations and any rectifications.

In an alternative aspect the present invention provides an event analysis method for identifying contributing factors relating to an event to be analysed, the method comprising the steps of: identifying one or more relevant environment factors which are material to the occurrence of the event and which may have the potential to alter the outcome of the event; determining for each of said one or more relevant environment factors whether the relevant environment factor has a potential to alter the outcome of the event; and for each relevant environment factor that is identified as having a potential to alter the outcome of the event, identifying the location, within the environment of the event, of the relevant environment factor's opportunity to alter the outcome of the event whereby the potential contributions of all relevant environment factors are identified.

In a further alternative aspect the present invention provides an event analysis system for identifying contributing factors relating to an event to be analysed, the system comprising: a data input device, for use by a user for inputting data concerning an event to be analysed; a display, for displaying to a user selectable data links, the selectable data links being used to automatically guide the user in the structured entry of data concerning the event to be analysed; a program memory in which is stored a set of instructions for analysing data input by a user concerning an event; a data store in which is stored one or more inventories, each inventory comprising data which describe an environment in which an event may occur, the data store further containing data concerning one or more types of events which may occur in an environment, data concerning environment factors which have the potential to contribute to an event and associations between the stored data; and a processor operatively connected to the program memory, the data store, the data input device and the display, the processor adapted to identify one or more relevant environment factors which are relevant to the analysis of the event and which may have the potential to alter the outcome of the event; determine for each of said one or more relevant environment factors whether the relevant environment factor has a potential to alter the outcome of the event; and for each relevant environment factor that is identified as having a potential to alter the outcome of the event, identify the location, within the environment of the event, of the relevant environment factor's opportunity to alter the outcome of the event.

In a yet still further aspect of the invention there is provided a tangible medium storing computer readable instructions for event analysis, the tangible medium storing computer readable instructions comprising: a first program construct of a plurality of program constructs adapted to identify a plurality of relevant environment factors which contribute to the occurrence of an event under analysis and which may have the potential to alter the outcome of the event; a second program construct of the plurality of program constructs adapted to determine for each of said one or more relevant environment factors individually whether the relevant environment factor has a potential to alter the outcome of the event; and a third program construct of the plurality of program constructs adapted to identify, for each relevant environment factor that is identified as having a potential to alter the outcome of the event, a location, within the environment of the event, of the relevant environment factor's opportunity to alter the outcome of the event.

With the present invention a plurality of environment factors which had/have the potential to contribute to the event are identified and analysed independently of each other. By means of such independent analysis of each factor, those factors which may not have contributed to an actual event but which have the potential to contribute to a similar future event are not obscured by the specifics of the actual event. Thus the present invention offers a method and a system of event analysis in which the potential contributions of all environment factors rather than the actual contributions of only a few environment factors are identified but without the problems of divergent results that can arise with conventional risk analysis techniques.

The methodology which is applied by means of the present invention is referred to herein as Failure Path™ analysis.

BRIEF DESCRIPTION OF THE DRAWINGS

Exemplary embodiments of the present invention will now be described by way of example with reference to the accompanying drawings, in which:

FIGS. 4a and 4b are examples of datasheets populated with data from an actual air accident using the Failure Path™ methodology in accordance with the present invention; and FIGS. 5a and 5b are examples of datasheets populated with data from a medical error using the Failure Path™ methodology in accordance with the present invention.

DETAILED DESCRIPTION OF EXEMPLARY EMBODIMENTS

Before describing a specific implementation of the Failure Path™ methodology, a brief explanation of the theory underlying the methodology is set out below. The methodology of Failure Path™ analysis is founded upon the following three concepts:

Any human activity or endeavour can be viewed as an activity environment. Similarly any activity of nature (earthquake, storm, flood, etc) can be viewed as an activity environment.

An event in the form of an accident or loss is a manifestation of a failure in the activity environment.

Opportunities to prevent or mitigate an accident or loss always exist.

In the context of this document it is to be understood that reference herein to an environment in the context of an activity and an event is intended to encompass all factors dictating or influencing the conduct of an activity and an event. For example, an activity environment encompasses regulatory requirements, standardised procedures, any tools and their regular function required by an activity as well as the conditions such as temperature and illumination in which the activity is performed. Moreover, it is to be understood that the terms activity and event used herein have their usual and customary meanings subject to the term event being understood as reference to an accident, error, loss or damage or a potential accident, error, loss or damage. Furthermore, any human activity or endeavour can be viewed as an activity in the context of this document as well as any activity of nature (earthquake, storm, flood, etc). In this regard, the term activity environment encompasses but is not limited to systems of transport, of manufacture, of material processing, of health care, of professional activities, of computer systems, of public services, of administration, of bureaucracy, of regulation etc.

Any activity environment must seek simultaneously to achieve two prime objectives, the pursuit of the activity and the prevention of concomitant accident or loss. An influential school of thought holds that these two objectives are incompatible. An aircraft must be airborne if it is to operate and if it is airborne it is prone to airborne misadventure. If it stays on the ground, it is invulnerable to airborne misadventure, but it no longer achieves its purpose, which is to fly. Its activity environment is not operational. However, if it flies and has an accident, the activity environment has failed to achieve a prime objective. Such failures of activity environments are the subject of the Failure Path™ methodology.

Figure 1:
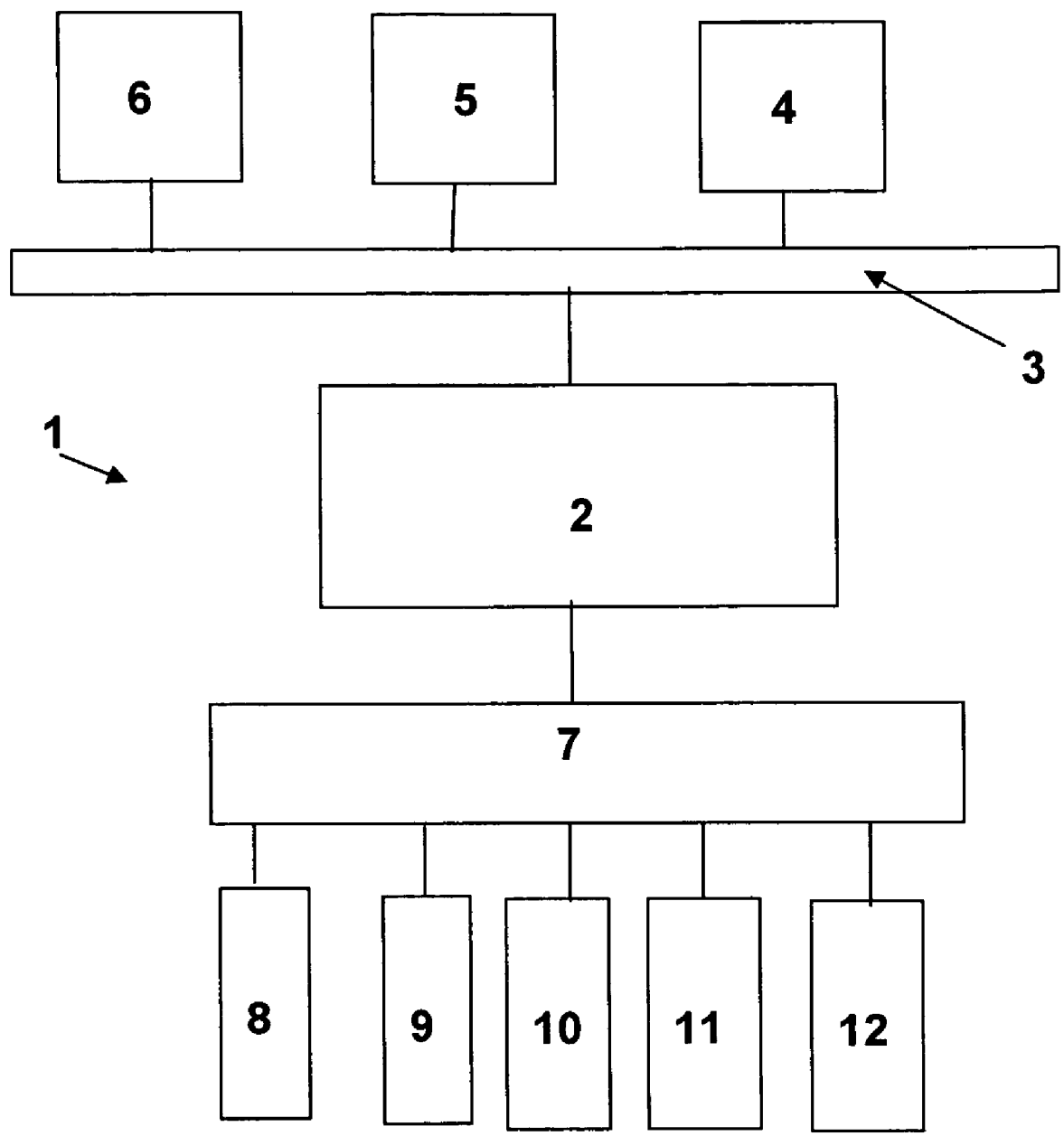
FIG. 1 illustrates the hardware of an event analysis system in accordance with the present invention.

An embodiment of the event analysis system preferably comprises a suite of software installed on a computer. The computing power and memory capacity of processors employed in a conventional desktop computer is sufficient for implementing the event analysis software. In the alternative, of course, the event analysis system may be implemented in an ASIC chip. The event analysis system 1 illustrated in FIG. 1 comprises one or more processors 2 which are operatively connected by means of a command/data bus 3 to a program memory 4, a data store 5 and RAM 6. The processors 2 are additionally operatively connected via an input/output interface 7 to input and output peripherals such as, but not limited to, a keyboard 8, a navigation tool such as a mouse 9, a display 10, an output data port 11 and a printer 12.

The suite of software programs necessary for implementation of the event analysis system is stored in the program memory 4 with the programs for the front end to the event analysis system i.e. that part of the software programs with which a user interacts preferably being written in Visual Basic™. The program memory 4 additionally contains report writing and general utilities software. Alternatively, the suite of software programs in the form of a plurality of program constructs may be recorded on a tangible computer readable medium.

Figure 2:
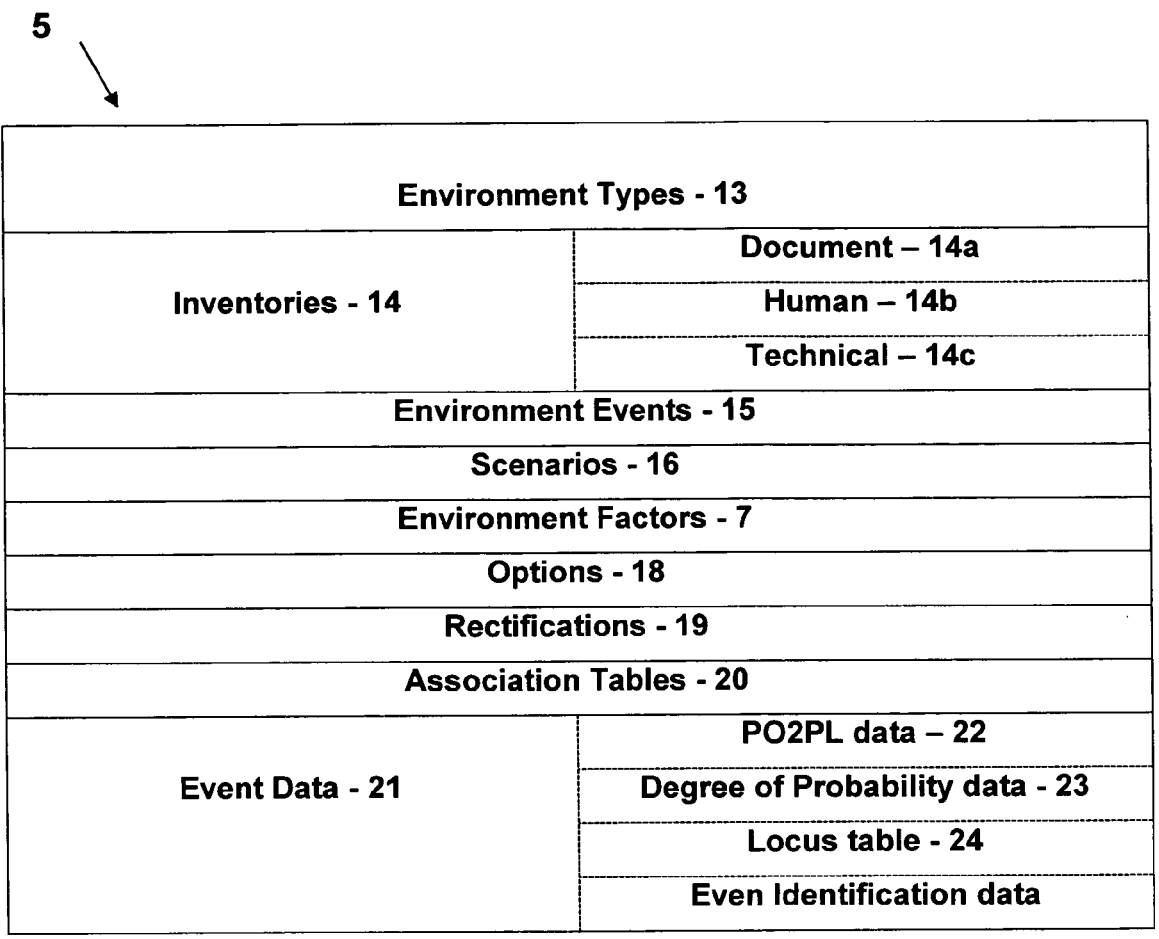
FIG. 2 illustrates the various data types stored in the data store of the event analysis system of FIG. 1.
Figure 3:
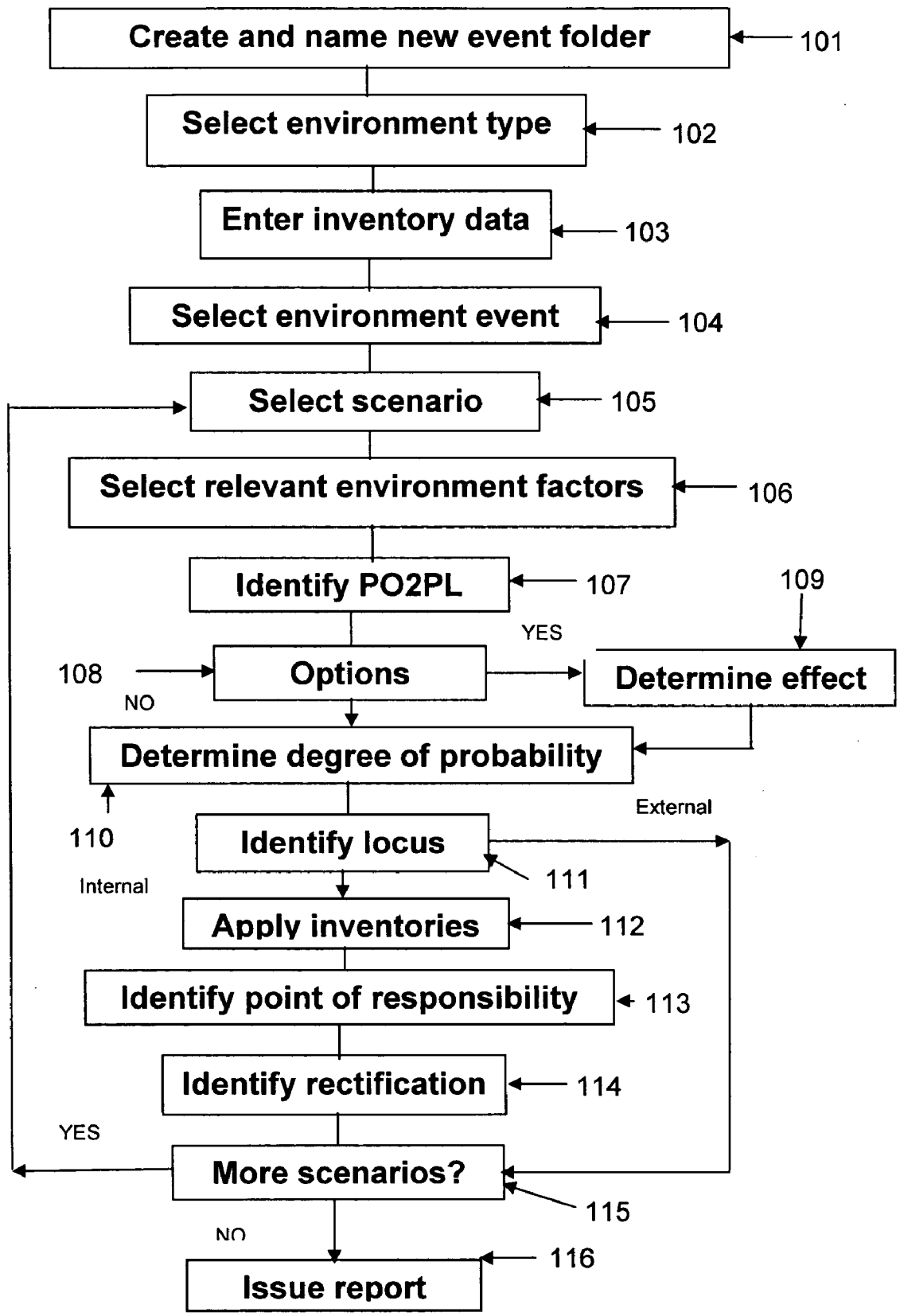
FIG. 3 illustrates an overview of the Failure Path™ analysis process.

The data store 5 contains a plurality of addressable read/write databases, a plurality of association tables 20 and one or more event specific databases 21 each of which will be described in greater detail below. Ideally, the databases are constructed using MS Access™ with all data within the databases being separately accessible by means of unique identification codes and the association tables 20 identifying with respect to the identification codes linked data from different databases. As illustrated in FIG. 2, the data store 5 includes the following databases: an activity environment type table 13; an inventory table 14, the inventory table being sub-divided into three sections: a document section 14*a*, a human section 14*b* and a technical section 14*c*; an environment event table 15; a scenarios table 16; an environment factors table 17; an environment factors options table 18; and a rectification table 19. The association tables 20 identify links between the following: each environment type stored in the environment type table 13 and relevant data contained in the inventory table 14; each environment event and relevant data contained in the scenarios table 16; each scenario and data contained in the environment factors table 17; and each environment factor and data in the options table 18. This list is not intended to be comprehensive and other associations or links between data in different databases is envisaged. Furthermore, although reference is made herein to different databases and tables for the sake of clarity, all of the data may be contained in a single addressable database. The data store 5 also stores event data 21 on individual events input by a user for analysis by the system. Preferably, for ease of access, this event data is stored in a separate event folder. Each event folder contains in addition to event and user identification data, 'PO2PL' (Potential Opportunity to Prevent Loss) data 22, degree of probability data 23 specific to each PO2PL, and a locus table 24 containing data on loci specific to each PO2PL. The nature and use of the data contained in the data store 5 is described in greater detail below.

Use of the event analysis system 1 will now be described with reference to an adverse event that has occurred such as a road accident. However, it is to be understood that the event analysis system of the present invention is applicable to any activity environment, examples including systems of transport, of manufacture, of material processing, of health care, of professional activities, of computer systems, of public services, of administration, of bureaucracy, of regulation etc.

Preferably the event analysis system is pre-programmed with inventory data relating to selectable activity environment types. For the purposes of the inventory data, each activity environment type is divided into three sub-environments: documentary, human and, if applicable technical. The inventory data of the documentary sub-environment will cover all standing documentation which affects the event to be analysed. It may extend to cover documents originating and residing in different organisations. The Inventory data of the human sub-environment comprises the organisation chart of the central organisation. Again it may extend to cover other relevant organisation charts. When applicable, the inventory data of the technical sub-environment contains all technical modules, components and processes. Alternatively, the documentary, human and technical sub-environments may be created by a user when prompted.

When a road accident has occurred all of the relevant information concerning the accident must first be collected in the usual manner by the relevant authorities such as the police. Once all the accident information has been collected, factual and objective accident data from the accident information is input by a user into the event analysis system. The user is guided in the entry of the accident data so that the data entry is structured for the purposes of subsequent analysis of the data by the system.

When first opening the event analysis software the user will be prompted either to select a folder relating to an existing event for which data has already been entered or to select the creation of a new folder for a new event, in this case a road accident (step 101). The folder contains the database specific to the event under analysis. Having selected the creation of a new folder, the user will then be prompted by the event analysis system to allocate a unique name to the new folder. Alternatively a unique default name is automatically selected by the system.

Once the folder has been created the user will be presented, for example by means of a drop-down menu, with a series of selectable links each describing a different activity environment type. For example, the activity environment type may be road transport, air transport, oil refinery, health services. The absence of a relevant environment type for selection indicates the absence of an associated inventory for that activity environment type. Where a suitable activity environment type is not already listed, the user may input to the system a request for creation of a new activity environment type. In response to such a request the system will prompt the user to create an environment inventory specific to the activity environment type to be analysed (step 103).

Once an activity environment type has been selected by the user (step 102) or a new activity environment type and its inventory created, a new series of selectable links will be displayed to the user, specific to the selected activity environment type. Each selectable link describes a different environment event. For example, in the case of the activity environment type air transport, an environment event may be "aircraft mid-air collision". In the case of the activity environment type health services, the environment event might be "patient injury". In the case of an activity environment type road transport, selectable environment events may include: "collision involving a vehicle and a pedestrian" or "collision involving two or more vehicles" etc. From this list the user selects the relevant environment event (step 104).

Once the user has selected an environment event the system then presents the user with a list of different scenarios pertaining to the activity environment type and environment event chosen scenarios correspond to subject positions or viewpoints from which the subsequent analysis of the event is performed. Selection from this list of the scenario to be evaluated (step 105) will be at the discretion of the body commissioning the analysis or will be made by the user. In a simple event or when so directed, there will be only one scenario. In a complex event, or when there is more than one possible primary cause of the environment event, there will be more than one relevant scenario and the user may select a plurality of different scenarios, entering the data for each scenario in turn. The process of entering data for a scenario can be repeated as many times as is necessary until all scenarios which have been identified, conjectured or specified have been selected.

In a road accident, scenarios might include:
Performance of Driver A
Performance of Driver B
Road Geography
Technical Specification and Condition of Car A
Technical Specification and Condition of Car B
Weather Conditions For each scenario a separate set of data is input by the user, a separate Failure Path™ analysis is conducted, and a separate set of results is produced.

Having selected a scenario the user will then be presented on the display 10 with a list of environment factors relating to the chosen scenario. From this list the user selects relevant environment factors, i.e. those environment factors which are relevant to the event under consideration (step 106). It should be noted that this selection is only of the relevant environment factors to be subjected to a Failure Path™ analysis; it is only the input to the next stage of the analysis. It does not prejudge the output of that stage, namely the determination of whether the relevant environment factor has or has not had a bearing on the environment event. Each of those relevant environment factors found to have a bearing is, in the terminology of Failure Path™ analysis, a 'Possible Opportunity to Prevent Loss' (PO2PL).

In the example of a road event, and dependent on the scenario under consideration, relevant environment factors might include:
Inadequate sightlines from the various roads
Inadequate signs from the various roads
Road surface defects
Distracting roadworks
Inappropriate speed limits
Inappropriate speeds of the various vehicles
Inadequate manoeuvres by the various vehicles involved
Indistinctive colours of the vehicles involved
Vehicle tyre performance limitations
Inadequate tyres, inadequate brakes, poor conditions, age/risk factor, inadequate driver experience, influences on performance, inadequate driver performance, inhibitions on driver vision or hearing, time of day, adverse weather, other traffic distractions, pedestrian distraction etc.

The above list is neither inclusive nor exclusive. Moreover, it will be apparent that, for a given environment event, the relevant environment factors differ from scenario to scenario, and also that relevant environment factors are totally different in different activity environment types (road transport, air transport, health administration etc).

Each relevant environment factor is then evaluated either by the user or by the system to determine (step 107) whether the relevant environment factor has the capacity to alter the outcome of the event (a Potential Opportunity to Prevent Loss in the case of an adverse event), referred to herein as a PO2PL. Those factors found not to constitute a PO2PL remain stored in the event analysis system as selected environment factors and as such are available for reconsideration and for audit. Those factors found to constitute a PO2PL are then transferred to the next stage of the analysis. Reference to altering the outcome of the event is reference to any type of change in the event either in terms of a reduction in the extent of any damage, injury or loss or avoidance of the event altogether.

The next stage and the next screen displayed to the user provides the facility to investigate the PO2PLs. Firstly the user is prompted by the system to identify for each PO2PL the option (step 108) namely whether the environment factor could have been changed, be that improved, decreased, reduced, addressed or modified, etc. Alternatively, the system may be pre-programmed with data on whether each selectable environment factor is capable of change. Next the effect that this option would have on the environment event is determined (step 109) either by the user or by the event analysis system. Finally a rating in the form of the degree of probability with which that effect on the environment event can be affirmed is determined (step 110) from a predetermined scale by the user or by the system. The degree of probability ranges in steps from Certainty down to Nil. Nil represents certainty of no effect, and would be accorded to an option which was positively determined by the analysis to have had no effect in the scenario under consideration. Of course, that same option may have an important effect in another scenario. The selectable ratings can be represented by ranges of probability values but more preferably the ratings are represented by words and phrases which have a commonly understood meaning and relative relationship.

Once a PO2PL is identified by the system and its option and option effect have been determined, the system then determines the location of each PO2PL in the environment (step 111) which is referred to as the locus of the PO2PL. A locus may be external, that is external to the viewpoint adopted by the event analysis system e.g. external to the organisation instructing the analysis, or internal. If internal, a locus is processed in a series of steps of successively increasing detail from a general locus to a precise locus until it is pinpointed. loci found to be external are recorded as such. This record is further processed on the next screen. Loci found to be internal are further processed by an internal programme to determine their general loci in terms of in which sub-environment(s) of the overall environment they lie (step 112). As mentioned above there are three sub-environments: documentary, human, and technical. The documentary sub-environment comprises all written standing documentation. The human sub-environment comprises all human inputs, actions, orders, advice, etc, and includes inputs written specifically for the event presently under consideration. The technical sub-environment comprises technical and computer processes. At this stage therefore a first, general statement of the locus of each PO2PL is generated by the system.

The event analysis system then takes all the data entered by the user and processes the data to generate a number of conclusions. The final stage of the Failure Path™ analysis of the environment event brings the previous two stages forward and expands on them in the context of the scenario under consideration. At this juncture the analysis system has identified and listed all PO2PLs, and for each PO2PL, an associated option, option effect, and a first statement of its locus.

This stage draws on the Inventories of each of the three sub-environments; that were either input at the outset or were existing inventories stored in the system. As a reminder, the data input to the documentary sub-environment was the detailed inventory of all standing documentation. The data input to the human sub-environment was the details and roles of all human participants and, when applicable, the organisation chart for the organisation under consideration. The data input to the technical sub-environment was the relevant inventories and diagrams of that sub-environment.

For each PO2PL the precise locus of the PO2PL on the sub-environment(s) Inventory is identified. To assist in understanding, the precise locus of a PO2PL is stated in terms of its location on an appropriate grid on which the general locus namely the relevant sub-environment (documentary, human or technical) is displayed. The general locus of each PO2PL has been determined in a previous stage.

A precise locus in the documentary sub-environment is defined by two factors:

locus category: the name of the document and locus site: a detailed reference to chapter, section, paragraph, and line.

A precise locus in the human sub-environment is defined by two factors:

locus category: the nature of the PO2PL: action, decision, order, advice or other, this factor being provided by a preloaded program, and locus site: the job title of the person who took the action, decision, etc, this being provided by the preloaded sub-environment Inventory.

A precise locus in a technical sub-environment is defined by reference to parameters appropriate to the specific technical sub-environment under consideration.

The status of the PO2PL, with respect to the precise locus is then selected from a preloaded program. The status of a document can be mandatory, advisory or discretionary. In the human sub-environment an order is mandatory but advice advisory; an action is discretionary. Status will generally not be applicable to PO2PLs in the technical sub-environment.

The stage at which the PO2PL occurred is then selected from a preloaded program. The number of stages is dependent upon the environment under consideration. It is a minimum of three:

1. foundation stage: prior to the commencement of the planning and conduct of the activity which culminated or could have culminated in the environmental event.
2. activity stage; during the planning and conduct of the activity.
3. final event stage: from the point at which the environment event was unavoidable.

The point of responsibility (PoR) relating to the precise locus of each PO2PL is extracted from the preloaded inventories (step 113). point of responsibility in the documentary sub-environment will be the signatory to the document. Note that this documentary PoR will be accompanied by PoRs in the human sub-environment whenever instruction or advice to utilise the document is passed on down the human sub-environment. The PoR in the human sub-environment is the person who took the action or gave the order, advice, etc. The user records the PoR for each PO2PL. In the road traffic example the PoRs will include the Highways Authority and/or County Councils for such things as road surfaces or road signs, drivers for speed and manoeuvres, or car manufacturers for vehicle system performance.

Finally rectification for each PO2PL is extracted from a preloaded program (step 114). The criterion for rectification is that it would have had the effect of avoiding, lessening or mitigating the loss attaching to the environment event. Rectification would be actions such as Visibility—Improve, Speed limit—Restrict to 20 mph, Road Surface Regulations—Tighten.

Once the analysis is complete, a check is made to determine whether there are further scenarios that are to be analysed (step 115) following which either the analysis returns to step 105 or, where there are no further scenarios, the event analysis system then summarises by means of one or more reports (step 116) the analysis of all PO2PLs and thus of the total activity environment. It collates all the environment event data retrieved based on the data inputs, user selections and the results automatically generated by the analysis. The PO2PLs, their detailed loci, and the rectifications can be analysed and assessed on an individual basis. For example, if excess speed by Car A were found to have been a PO2PL or, putting it loosely and in different terms, to have contributed to an accident, the analysis might record the following:

| | |
|---|---|
| PO2PL | Car A Speed |
| Option | Lower speed |
| Effect | Material and Human loss avoided |
| Sub-Environment | Human |

-continued

| Locus Category | Action |
|---|---|
| Locus Site | Driver A |
| Status | Discretionary |
| Stage | Activity |
| PoR | Driver A |
| Option Detail | Speed below 20 mph |
| Rectification | Driver discipline and retraining |

It should be noted that this is only one of the much larger number of PO2PLs which the event analysis system will identify, process and on which a report can be produced. Thus, with the event analysis system one or more PO2PLs are identified but the total number of PO2PLs remains finite and so the number does not become unmanageable. As described, the content of the environment is structured so as to remain manageable and has boundaries which are at least quasi-objective.

In FIGS. 4a and 4b and 5a and 5b the datasheets for two separate real-life accidents are shown using the Failure Path™ analysis described above.

EXAMPLE 1

The datasheets of FIGS. 4a and 4b relate to an air accident and the basic facts of the accident are that an aircraft crashed as a result of a wing drop (sudden roll) on take-off. The wing dropped as a result of interference with the lifting properties of the wings by the presence of ice or frost on the wing surfaces.

The first step in the Failure Path™ analysis is to collect all relevant data on the accident, in this case the Air Accident Investigation Board (AAIB) report on the air accident has been relied upon and where the analysis is to be performed by a computer entering the details of the accident into the system. The second step in the analysis requires the identification of all critical event scenarios (CES). Each CES is then analysed separately and FIGS. 4a and 4b are concerned specifically with the CES: 'the aerodynamic effect of frost or ice on a lifting surface'. Having identified the CES (step 105) an inventory of all standing documentation (documentary sub-system) relevant to that CES is then compiled as well as identifying the human organisational structure (human sub-system) involved in the CES and also data on all technical modules, processes, software etc. relevant to the CES are compiled.

The next step (Step 106) in the Failure Path™ analysis is to identify all factors of relevance to the CES identified above and in Step 107 each factor is assessed to determine, objectively or quasi-objectively, whether each factor constitutes a possible opportunity to prevent or mitigate loss (PO2PL). This may be performed manually or using a computer implemented event analysis method. Any factor deemed not to be a PO2PL is noted as 'not relevant' but is retained in the analysis for the purposes of auditing.

Either manually or electronically each PO2PL is then assessed to identify, with respect to the PO2PL, what option, which was not taken, could have prevented or mitigated the loss—Step 108. An effect which would have been achieved if that option had been taken is also recorded—Step 109. Ideally, the effect is selected from the following list: Where PO2PLs are pre-stored in the event analysis system, options and effects may also be stored and associated to their respective PO2PLs by means of association tables.

TABLE 1

| OPTION EFFECT | OPTION EFFECT CODE |
|---|---|
| Human Loss Reduced | HLR |
| Human Loss Avoided | HLA |
| Material Loss Reduced | MLR |
| Material Loss Avoided | MLA |
| Total Loss Reduced | TLR |
| Total Loss Avoided | TLA |

The degree of probability with which each option is likely to have had its specified effect on the event is then assessed (Step 110) and categorised into one of seven categories set out below.

TABLE 2

| DEGREE OF PROBABILITY | CATEGORY | DESCRIPTION |
|---|---|---|
| Certain | Certain (99-100%) | No doubt whatsoever |
| Hi Prob | Highly Probable (76-98%) | Beyond reasonable doubt |
| Prob | Probable (51-75%) | On the balance of probabilities |
| Poss | Possible (5-50%) | Some evidence |
| Lo Poss | Low possibility (¼%) | Some credibility |
| Nil | No possibility (0%) | Positive evidence against |
| ? | Unknown | Cannot be determined |

It should be noted that the degree of probability is determined on the assumption that the PO2PL is correct. Also, in the event analysis system each option may be associated with one or more pre-determined degrees of probability also stored in the system. Whether the PO2PL is an actual opportunity to prevent loss is determined later in the analysis.

The locus of the PO2PL is then determined in the next steps of the Failure Path™ analysis. Firstly, the locus of each PO2PL is identified (Step 111) with respect to whether the locus is internal to the environment and in which sub-system (documentary, human or technical) the PO2PL is located or (Step 111') whether the locus is external to the environment e.g. a government enactment. Identification of the locus may be performed manually or electronically with respect to the inventory that is recorded. As may be seen from FIG. 4a, a PO2PL may have a locus in more than one sub-system. Turning now to FIG. 4b, for each locus of each PO2PL the category of the locus and the status of the locus is identified. In FIG. 4b only one sub-system for each PO2PL has been considered. In practice, where a PO2PL is deemed to have a locus in more than one sub-system, the locus in each sub-system is analysed in turn. In the case of the documentary sub-system the categories of document will depend upon the environment. In the case of an air accident categories of documents include US Federal Aviation Administration (FAA) regulations, Air Navigation Orders, Air Staff Instructions, Company Regulations Flying Manuals etc. and the status of the documents is mandatory or advisory. In the case of the human sub-system the categories and the status of each category is set out below in Table 3. The categories decision and action are allocated the status discretionary as the categories decision and action reflect human choice, be it to obey or disobey an order or to accept or reject advice or to exercise discretion in the absence of an order or advice.

TABLE 3

| CATEGORY | STATUS |
| --- | --- |
| ad hoc Written Order | Mandatory |
| ad hoc Written Advice | Advisory/Discretionary |
| Verbal order | Mandatory |
| Verbal Advice | Advisory/Discretionary |
| Decision | Discretionary |
| Action | Discretionary |

For the technical sub-system the category is specific to the technology involved e.g. fuel supply, control systems etc and these have no status.

The stage at which the PO2PL has an effect is then identified, in this example either the foundation stage or the final event stage and then the site within the sub-system of the locus is identified. These steps may be performed manually or electronically/interactively using the event analysis system. In the documentary sub-system the site is ideally specific to the document concerned, the chapter and even the paragraph or line of relevance (omitted from FIG. 4b for ease of reference). In the human sub-system the site is specific to the responsible person or persons in the organisational structure and in the case of the technical sub-system the individual component involved is identified.

Next, the point of responsibility is identified (Step 113) which in the case of the documentary sub-system is the person who signs off the document; in the human sub-system a person or job title may be identified as the point of responsibility and in the case of the technical sub-system the point of responsibility is identified with respect to a relevant activity such as design, standards, inspection maintenance etc. With a computer implemented event analysis method the points of responsibility for different factors will have been recorded and associated with the relevant loci when the inventory of the accident was first entered into the system. If not, the event analysis system prompts the user to identify the point of responsibility for a specific PO2PL where the relevant data was omitted from the inventory.

In the case of this event, the nature of the failure in each case is identified using one of the following descriptors: Omitted, Unclear, Lax, Unsafe and in Step 114 possible rectification of the failure is identified in accordance with the following descriptors: Mandate, Tighten, Recommend and Delete. Similarly, possible rectifications may be pre-stored in the event analysis system with a computer implemented event analysis method.

Using the Failure Path™ methodology the following points, amongst many others, were noted with respect to this air accident.

Where an aircraft is found to have, as in this case, a supercritical aerofoil and an unforgiving stall there may be justification for mandating de-icing at the take-off point or special ice prevention, detection or warning systems.

The documentary orders issued by the relevant authority could be deemed misleading. They refer to the permissibility of "polished frost". The concept of polished frost is not defined nor is it widely recognised.

The orders of the aircraft operator forbid take-off where frost is found adhered to underwing surfaces but no equivalent statement can be found forbidding take-off where frost is found on the leading edges or overwing which is generally deemed more harmful.

The need for de-icing would have been apparent to most professional flight crews and yet the flight crew on this occasion did not de-ice before take-off. Further investigation into the corporate culture of the air service concerned and the training of flight crews would be justified.

As mentioned earlier, the AAIB investigated the causes of this accident and their report contained 7 recommendations each of which addressed a key aspect of the accident. In contrast, the complete Failure Path™ analysis of the same accident identified 35 PO2PLs of which 14 added detail to the AAIB safety recommendations and a further 21 offered a new perspective. For example, only the second of the four points appearing above were contained in the AAIB report. Thus, with the Failure Path™ methodology not only are the immediate causes of an accident identified (as was done by the AAIB) but the environment as a whole is considered. In this way any weaknesses in the environment which are not manifest as they have not, yet, caused an accident or been identified as an accident cause are identified by the Failure Path™ methodology at the same time as those weaknesses which are manifest.

EXAMPLE 2

The datasheets of FIGS. 5a and 5b relate to an error that was made in a hospital and the basic facts of the error are that a drug was injected into the spine of a patient rather than intravenously.

Again the first step in the Failure Path™ analysis is to collect all relevant data on the error, in this case an independent expert's report on the error has been relied upon. The second step in the analysis requires the identification of all critical event scenarios (CES). Each CES is then analysed separately and FIGS. 5a and 5b are concerned specifically with the CES: 'the intrathecal (IT) injection of an intravenous (IV) drug'. Having identified the CES (step 105) an inventory of all standing documentation (documentary sub-system) relevant to that CES is then compiled as well as identifying the human organisational structure (human sub-system) involved in the CES and also data on all technical aspects relevant to the CES are compiled e.g. syringe design.

The next step (Step 106) in the Failure Path™ analysis is to identify all factors of relevance to the CES identified above and in Step 107 each factor is assessed to determined, objectively, whether each factor constitutes a possible opportunity to prevent or mitigate loss (PO2PL). Any factor deemed not to be a PO2PL is noted as 'not relevant' but is retained in the analysis for the purposes of auditing.

Each PO2PL is then assessed to identify, with respect to the PO2PL, what option, which was not taken, could have prevented or mitigated the loss—Step 108. An effect which would have been achieved if that option had been taken is also recorded—Step 109. Ideally, the effect is selected from the following list:

TABLE 4

| OPTION EFFECT | OPTION EFFECT CODE |
| --- | --- |
| Human Loss Reduced | HLR |
| Human Loss Avoided | HLA |
| Material Loss Reduced | MLR |
| Material Loss Avoided | MLA |
| Total Loss Reduced | TLR |
| Total Loss Avoided | TLA |

The reference under option to "Dedicated IT" is the proposal that intrathecal and intravenous needles should be redesigned to have dedicated syringe connectors. In so doing a syringe containing a medicament for intrathecal injection could not be connected to an intravenous needle and vice versa.

The degree of probability with which each option effect is likely to have affected the event is then assessed (Step 110) and categorised into one of seven categories set out below.

TABLE 5

| DEGREE OF PROBABILITY | CATEGORY | DESCRIPTION |
| --- | --- | --- |
| Certain | Certain (99-100%) | No doubt whatsoever |
| Hi Prob | Highly Probable (76-98%) | Beyond reasonable doubt |
| Prob | Probable (51-75%) | On the balance of probabilities |
| Poss | Possible (5-50%) | Some evidence |
| Lo Poss | Low possibility (¼%) | Some credibility |
| Nil | No possibility (0%) | Positive evidence against |
| ? | Unknown | Cannot be determined |

The locus of the PO2PL is then determined in the next steps of the Failure Path™ analysis. Firstly, the locus of each PO2PL is identified (Step 111) with respect to whether the locus is internal to the environment and in which sub-system (documentary, human or technical) the PO2PL is located or (Step 111') whether the locus is external to the environment e.g. the action of the patient. Turning to FIG. 5B, only one sub-system for each PO2PL has been considered. In practice, where a PO2PL is deemed to have a locus in more than one sub-system, the locus in each sub-system is analysed in turn. In the case of the human sub-system the categories and the status of each category is set out below in Table 6.

TABLE 6

| CATEGORY | STATUS |
| --- | --- |
| ad hoc Written Order | Mandatory |
| ad hoc Written Advice | Advisory/Discretionary |
| Verbal order | Mandatory |
| Verbal Advice | Advisory/Discretionary |
| Decision | Discretionary |
| Action | Discretionary |

The stage at which the PO2PL has an effect is then identified, in this example foundation stage or final event stage and then the site within the sub-system of the locus is identified. In the documentary sub-system the site is specific to the document concerned, the chapter and even the paragraph or line of relevance. In the human sub-system the site is specific to the responsible person or persons in the organisational structure and in the case of the technical sub-system the individual component involved is identified.

Next, the point of responsibility is identified (Step 113) which in the case of the documentary sub-system is the person who signs off the document; in the human sub-system a person or job title may be identified as the point of responsibility and in the case of the technical sub-system the point of responsibility is identified with respect to a relevant activity such as design, standards, inspection maintenance etc.

The nature of the failure in each case is identified using descriptors such as: Omitted, Lax and Unsafe—General and in Step 114 possible rectification of the failure is identified in accordance with the following descriptors: Mandate, Enforce, Tighten, and Comply.

Using the Failure Path™ methodology the following points, amongst many others, were noted with respect to this error.

Both the manufacturer and the hospital staff had made attempts to clearly label the drug to prevent accidental IT injection. These efforts were inconsistent.

No formal protocol for the separation of IT and IV drugs was enforced. The arrangements made for separating IV and IT drugs were inconsistent and unsatisfactory.

The failure of the patient to attend an earlier appointment without giving prior notice resulted in a doctor going home prior to the patient arriving without notice in the afternoon, which doctor would otherwise have been present.

The staff present when the error was made each assumed others present had a greater knowledge than was actually the case. In this regard, although the danger of IT injection of the particular drug was well known in the medical profession, the staff that were present were not adequately alert to the danger.

Overall, the results of the Failure Path™ analysis are complementary to the conclusions of the expert's report. However, unlike the expert's report, with the Failure Path™ methodology not only are the immediate causes of the error identified but weaknesses within the environment as a whole were identified which were not necessarily considered in the expert's report as a result of the specific remit of that report.

Failure Path™ analysis thus identifies the nature and loci of the failures in the environment which culminated in the environment event. Failure Path™ analysis also identifies the remedial action which would remove or ameliorate these environment failures.

From this final analysis screen, the user will have the option of printing out the results.

The event analysis system is thus a tool to analyse events and includes an inventory of environment factors which may have a bearing on an event. The event analysis system also includes means for generating a portfolio of reports, including reports specific to rectification recommendations or audit trail reports. Although the Failure Path™ method has been described predominantly in terms of its implementation on a computerised system, the method may also be performed by a user manually. When the method is performed manually, the use of spreadsheet documentation, such as an Excel™ spreadsheet, can assist in collating the relevant data for analysis.

The event analysis system and method which employs the Failure Path™ methodology extracts useful information concerning an adverse event that has happened or is conjectured, to assist subsequent decision making. For example, in the case of either an accident that has happened or an hypothetical accident (in the case of risk identification and prevention) the following stages in any analysis are envisaged:

1. Conventional accident investigation determines the immediate cause of the accident, actual or hypothetical. In simple terms, it identifies the bit that went wrong or could have gone wrong.
2. The Failure Path™ analysis concept is that causation is a failure of prevention. It establishes common ground between the two concepts of causation: the scientific (when A follows B, then B is a cause of A) and the legal (when, but for B, A would not have occurred, then B is the cause of A). In each case B is a failure of prevention.
3. Failure Path™ analysis is applied to the findings of the conventional investigation, to identify where and how the accident could have been prevented.

4. Based on the Failure Path™ analysis findings, remedial action to address the accident causes is decided by an appropriate body.
5. Based on the Failure Path™ analysis findings, the consideration of blame—a judicial or quasi-judicial process—is undertaken by an appropriate body.

Thus, the Failure Path™ system of the present invention requires only two sets of data input. The first set is a specification of the adverse outcome to be considered, that is the event to be prevented or investigated. The second set is an expert inventory of the activity environment to be analysed. Both of these inputs are objective or at least quasi-objective. Statistics are not employed and no reliance is placed on fault trees. From these two inputs, the Failure Path™ system proceeds through a number of programmed processes to its final reports. These reports include the identification of the scenario(s) with respect to which the event has been analysed, components of the activity environment relevant to the specific adverse event, their contribution to the environment, the point at which responsibility (not blame) lies, and appropriate rectification.

In comparison to conventional risk assessment systems:

The Failure Path™ system is neither quantitative nor qualitative. It is objective or at least quasi-objective. It is an analysis which involves a series of steps that build methodically into a comprehensive audit of the activity environment.

The Failure Path™ system is not based on assumptions. There is neither input of probabilities nor input of hypothetical questions. The Failure Path™ system examines the individual impact of the contributing factors independently of each other of the case in hand.

The methodology of the Failure Path™ system is not confined to a specific area or risk. It is capable of general application. It is valid for any form of environment of activity, including bureaucratic systems and regulatory systems. It is valid across a spectrum of magnitude from major environmental disaster down to minor domestic accident.

Thus, as has been shown the Failure Path™ system and method is a very powerful and cost-saving tool of accident investigation and prevention. It employs an accessible, systematic methodology which enables operating organisations to prevent foreseeable accidents and losses. It enables bureaucracies and regulatory bodies to prevent foreseeable adverse events. Thus the Failure Path™ system provides both a method of due diligence and a test of due diligence for retrospective inquiry.

It is claimed:

1. A computer implemented event analysis method for identifying contributing factors relating to an event to be analysed, the method comprising the steps, one or more of which are computer implemented, of:
   identifying one or more relevant environment factors which are material to the occurrence of the event and which may have the potential to alter the outcome of the event;
   determining for each of said one or more relevant environment factors whether the relevant environment factor has a potential to alter the outcome of the event;
   for each relevant environment factor that is identified as having a potential to alter the outcome of the event, identifying the location, within the environment of the event, of the relevant environment factor's opportunity to alter the outcome of the event whereby the potential contributions of all relevant environment factors are identified; and
   producing one or more reports in which is recorded data on the relevant environment factors which are identified as having a potential to alter the outcome of the event and their locations.

2. A computer implemented event analysis method as claimed in claim 1, further comprising the step of collecting data concerning the environment of the event to be analysed to form an inventory of the environment.

3. A computer implemented event analysis method as claimed in claim 2, wherein the inventory comprises a plurality of sections including a first section comprising data relating to documents which define aspects of the environment in which the event has or may occur; and a second section comprising data which describe the individuals and any organisation of those individuals which define aspects of the environment in which the event has or may occur.

4. A computer implemented event analysis method as claimed in claim 2, wherein the inventory includes a third section comprising data relating to technical modules, components and processes which define aspects of the environment in which the event has or may occur.

5. A computer implemented event analysis method as claimed in claim 2, wherein the identified location in the environment of a relevant environment factor's opportunity to alter the outcome of the event corresponds to one section of a plurality of sections of the inventory.

6. A computer implemented event analysis method as claimed in claim 2, wherein an identified location in the environment of a relevant environment factor's opportunity to alter the outcome of the event corresponds to one section of a plurality of sections of the inventory and once one section of the plurality of sections of the inventory has been identified as a location of a relevant environment factor's opportunity, a precise locus of the relevant environment factor's opportunity is determined which corresponds to data located in the one section of the inventory.

7. A computer implemented event analysis method as claimed in claim 2, wherein an identified location in the environment of a relevant environment factor's opportunity to alter the outcome of the event corresponds to one section of a plurality of sections of the inventory and wherein the method comprises the further step of identifying a point of responsibility, being that person or organisation having responsibility for the location of the relevant environment factor's opportunity.

8. A computer implemented event analysis method as claimed in claim 1, further comprising identifying for each relevant environment factor whether the relevant environment factor has the capacity to be altered.

9. A computer implemented event analysis method as claimed in claim 8, wherein where a relevant environment factor has been identified as having the capacity to be altered, an effect in terms of a possible change to the event is identified with respect to alteration of the relevant environment factor.

10. A computer implemented event analysis method as claimed in claim 8, wherein where a relevant environment factor has been identified as having the capacity to be altered, an effect in terms of a possible change to the event is identified with respect to alteration of the relevant environment factor and the effect is assigned a rating being representative of the likelihood of an alteration to the relevant environment factor causing an alteration to the outcome of the event.

11. A computer implemented event analysis method as claimed in claim 1, further comprising identifying for one or more relevant environment factors that are identified as having a potential to alter the outcome of the event a rectification being an action which would alter the outcome of the event.

12. A computer implemented event analysis method as claimed in claim 1, further comprising, before identifying one or more relevant environment factors which contribute to the occurrence of the event, selecting a scenario of the environment event, the scenario being a viewpoint from which the subsequent analysis of the event is performed and wherein the method is repeated for one or more further scenarios.

13. An event analysis method for identifying contributing factors relating to an event to be analysed, the method comprising the steps of:
   collecting data concerning the environment of the event to be analysed to form an inventory of the environment, the inventory comprising a plurality of sections including a first section comprising data relating to documents which define aspects of the environment in which the event has or may occur; and a second section comprising data which describe the individuals and any organisation of those individuals which define aspects of the environment in which the event has or may occur;
   identifying a plurality of relevant environment factors which are material to the occurrence of the event and which may have the potential to alter the outcome of the event;
   determining independently for each of said one or more relevant environment factors whether the relevant environment factor has a potential to alter the outcome of the event;
   for each relevant environment factor that is identified as having a potential to alter the outcome of to event, identifying the location, within the environment of the event, of each relevant environment factor's opportunity to alter the outcome of the event, the location being identified in relation to one of the plurality of sections of the inventory; and
   producing one or more reports in which is recorded data on the relevant environment factors which are identified as having a potential to alter the outcome of the event and their locations.

14. An event analysis method as claimed in claim 13, wherein a point of responsibility, being that person or organisation having responsibility for the location of the relevant environment factor's opportunity, is identified.

15. An event analysis method for identifying contributing factors relating to an event to be analysed, the method comprising the steps of:
   identifying a plurality of relevant environment factors which are material to the occurrence of the event and which may have the potential to alter the outcome of the event;
   determining individually for each of said one or more relevant environment factors whether the relevant environment factor has a potential to alter the outcome of the event;
   for each relevant environment factor which has a potential to alter the outcome of the event, identifying an effect in terms of an alteration to the outcome of the event which is theoretically achievable by means of a change to the relevant environment factor and assigning a rating to the likelihood of the effect being achieved;
   for each relevant environment factor that is identified as having a potential to alter the outcome of the event, identifying for each relevant environment factor the location, within the environment of the event, of each relevant environment factor's opportunity to alter the outcome of the event; and
   producing one or more reports in which is recorded data on the relevant environment factors which are identified as having a potential to alter the outcome of the event and their locations.

16. An event analysis method as claimed in claim 15, wherein each effect is rated with respect to a non-numerical scale of likelihood.

17. An event analysis method for identifying contributing factors relating to an event to be analysed, the method comprising the steps of:
   identifying one or more relevant environment factors which are material to the occurrence of the event and which may have the potential to alter the outcome of the event;
   determining for each of said one or more relevant environment factors whether the relevant environment factor has a potential to alter the outcome of the event;
   for each relevant environment factor that is identified as having a potential to alter the outcome of the event, identifying the location, within the environment of the event, of the relevant environment factor's opportunity to alter the outcome of the event whereby the potential contributions of all relevant environment factors are identified;
   producing one or more reports in which is recorded data on the relevant environment factors which are identified as having a potential to alter the outcome of the event and their locations.

18. An event analysis method as claimed in claim 17, further comprising the step of collecting data concerning the environment of the event to be analysed to form an inventory of the environment.

19. An event analysis method as claimed in claim 18, wherein the inventory comprises a plurality of sections including a first section comprising data relating to documents which define aspects of the environment in which the event has or may occur; and a second section comprising data which describe the individuals and any organisation of those individuals which define aspects of the environment in which the event has or may occur.

20. An event analysis method as claimed in claim 18, wherein the inventory includes a third section comprising data relating to technical modules, components and processes which define aspects of the environment in which the event has or may occur.

21. An event analysis method as claimed in claim 18, wherein the identified location in the environment of a relevant environment factor's opportunity to alter the outcome of the event corresponds to one section of a plurality of sections of the inventory.

22. An event analysis method as claimed in claim 18, wherein an identified location in the environment of a relevant environment factor's opportunity to alter the outcome of the event corresponds to one section of a plurality of sections of the inventory and once one section of the plurality of sections of the inventory has been identified as a location of a relevant environment factor's opportunity, a precise locus of the relevant environment factor's opportunity is determined which corresponds to data located in the one section of the inventory.

23. An event analysis method as claimed in claim 18, wherein an identified location in the environment of a relevant environment factor's opportunity to alter the outcome of the event corresponds to one section of a plurality of sections of the inventory and a point of responsibility, being that person or organisation having responsibility for the location of the relevant environment factor's opportunity, is identified.

24. An event analysis method as claimed in claim 17, further comprising identifying for each relevant environment factor whether the relevant environment factor has the capacity to be altered.

25. An event analysis method as claimed in claim 24, wherein where a relevant environment factor has been identified as having the capacity to be altered, an effect in terms of a possible change to the event is identified with respect to alteration of the relevant environment factor.

26. An event analysis method as claimed in claim 24, wherein where a relevant environment factor has been identified as having the capacity to be altered, an effect in terms of a possible change to the event is identified with respect to alteration of the relevant environment factor and the effect is assigned a rating being representative of the likelihood of an alteration to the relevant environment factor causing an alteration to the outcome of the event.

27. An event analysis method as claimed in claim 17, further comprising identifying for one or more relevant environment factor that have been identified as having a potential to alter the outcome of the event, whether there is a rectification in the form of an action to alter the outcome of the event.

28. An event analysis method as claimed in claim 17, further comprising, before identifying one or more relevant environment factors which contribute to the occurrence of the event, selecting a scenario of the environment event, the scenario being a viewpoint from which the subsequent analysis of the event is performed and wherein the method is repeated for one or more further scenarios.

29. An event analysis system for identifying contributing factors relating to an event to be analysed, the system comprising:
   a data input device, for use by a user for inputting data concerning an event to be analysed;
   a display, for displaying to a user selectable data links, the selectable data links being used to automatically guide the user in the structured entry of data concerning the event to be analysed;
   a program memory in which is stored a set of instructions for analysing data input by a user concerning an event;
   a data store in which is stored one or more inventories, each inventory comprising data which describe an environment in which an event may occur, the data store further containing data concerning one or more types of events which may occur in an environment, data concerning environment factors which have the potential to contribute to an event and associations between the stored data; and
   a processor operatively connected to the program memory, the data store, the data input device and the display, the processor adapted to
   identify one or more relevant environment factors which contribute to the occurrence of the event and which may have the potential to alter the outcome of the event;
   determine for each of said one or more relevant environment factors whether the relevant environment factor has a potential to alter the outcome of the event; and
   for each relevant environment factor that is identified as having a potential to alter the outcome of the event, identify the location, within the environment of the event, of the relevant environment factor's opportunity to alter the outcome of the event.

30. An event analysis system as claimed in claim 29, wherein the inventory comprises a plurality of sections including a first section comprising data relating to documents which define aspects of the environment in which the event has or may occur; and a second section comprising data which describe the individuals and any organisation of those individuals which define aspects of the environment in which the event has or may occur.

31. An event analysis system as claimed in claim 29, wherein the inventory includes a third section comprising data relating to technical modules, components and processes which define aspects of the environment in which the event has or may occur.

32. An event analysis system as claimed in claim 29, wherein the identified location in the environment of a relevant environment factor's opportunity to alter the outcome of the event corresponds to one section of the plurality of sections of the inventory.

33. An event analysis system as claimed in claim 29, wherein an identified location in the environment of a relevant environment factor's opportunity to alter the outcome of the event corresponds to one section of a plurality of sections of the inventory and once the one section of the plurality of sections of the inventory has been identified as a location of a relevant environment factor's opportunity, the set of instructions further includes instructions for determining a precise locus of the relevant environment factor's opportunity which corresponds to data located in the one section of the inventory.

34. An event analysis system as claimed in claim 29, wherein the set of instructions further includes instructions for identifying for each relevant environment factor whether the relevant environment factor has the capacity to be altered.

35. An event analysis system as claimed in claim 29, wherein the set of instructions further includes instructions for identifying for one or more relevant environment factor that have been identified as having a potential to alter the outcome of the event, a rectification in the form of an action to alter the outcome of the event.

36. An event analysis system as claimed in claim 35, wherein the set of instructions further includes instructions for producing one or more reports containing data on the relevant environment factors, their locations and any rectifications.

37. An event analysis system as claimed in claim 29, wherein before identifying one or more relevant environment factors that correspond to aspects of the event which contribute to the occurrence of the event, the set of instructions further includes instructions for selecting a scenario of the environment event, the scenario being a subject position from which the subsequent analysis of the event is performed.

38. An event analysis system for identifying contributing factors relating to an event to be analysed, the system comprising:
   a data input device, for use by a user for inputting data concerning an event to be analysed;
   a display, for displaying to a user selectable data links, the selectable data links being used to automatically guide the user in the structured entry of data concerning the event to be analysed;
   a program memory in which is stored a set of instructions for analysing data input by a user concerning an event;

a data store in which is stored one or more inventories, each inventory comprising data which describe an environment in which an event may occur, the inventory being sub-divided into sections, the data store further containing data concerning one or more types of events which may occur in an environment, data concerning environment factors which have the potential to contribute to an event and associations between the stored data; and a processor operatively connected to the program memory, the data store, the data input device and the display, the processor being adapted to perform the set of instructions stored in the program memory characterised in that the set of instructions stored in the program memory comprise instructions for performing the following functions:

identifying a plurality of relevant environment factors which contribute to the occurrence of the event and which may have the potential to alter the outcome of the event;

determining for each of said one or more relevant environment factors individually whether the relevant environment factor has a potential to alter the outcome of the event; and for each relevant environment factor that is identified as having a potential to alter the outcome of the event, identifying the location, within the environment of the event, in terms of a section of the inventory, of the relevant environment factor's opportunity to alter the outcome of the event.

39. A computer readable medium encoded with a computer program having instructions for event analysis, the computer program instructions comprising:

a first program construct of a plurality of program constructs adapted to identify a plurality of relevant environment factors which contribute to the occurrence of an event under analysis and which may have the potential to alter the outcome of the event;

a second program construct of the plurality of program constructs adapted to determine for each of said one or more relevant environment factors individually whether the relevant environment factor has a potential to alter the outcome of the event; and a third program construct of the plurality of program constructs adapted to identify, for each relevant environment factor that is identified as having a potential to alter the outcome of the event, a location, within the environment of the event, of the relevant environment factor's opportunity to alter the outcome of the event.

40. A computer readable medium as claimed in claim 39, wherein the computer program instructions further comprise a fourth program construct of the plurality of program constructs adapted to identify for one or more of the relevant environment factor that has a potential to alter the outcome of the event, a rectification being an action to alter the outcome of the event.

41. A computer readable medium as claimed in claim 40, wherein the computer program instructions further comprise a fifth program construct of the plurality of program constructs adapted to produce one or more reports containing data on relevant environment factors identified as having a potential to alter the outcome of the event, their locations and any rectifications.

* * * * *